United States Patent
Xu

(10) Patent No.: US 10,748,220 B2
(45) Date of Patent: Aug. 18, 2020

(54) ACCOUNT PROCESSING METHOD AND APPARATUS

(71) Applicant: Alibaba Group Holding Limited, Grand Cayman (KY)

(72) Inventor: Ji Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 404 days.

(21) Appl. No.: 14/816,948

(22) Filed: Aug. 3, 2015

(65) Prior Publication Data

US 2016/0035044 A1    Feb. 4, 2016
US 2016/0350865 A2    Dec. 1, 2016

(30) Foreign Application Priority Data

Aug. 4, 2014    (CN) .......................... 2014 1 0380154

(51) Int. Cl.
     *G06Q 40/00*      (2012.01)

(52) U.S. Cl.
     CPC ..... *G06Q 40/12* (2013.12); *G06F 2206/1012* (2013.01)

(58) Field of Classification Search
None
See application file for complete search history.

(56) References Cited

U.S. PATENT DOCUMENTS

2005/0165668 A1    7/2005    Hinkle
2007/0164098 A1    7/2007    Khalid et al.
2008/0167986 A1    7/2008    Plant
2009/0294527 A1    12/2009    Brabson et al.
2011/0251921 A1    10/2011    Kassaei et al.
(Continued)

FOREIGN PATENT DOCUMENTS

CN      101030311 A      9/2007
CN      101477667 A      7/2009
(Continued)

OTHER PUBLICATIONS

Topic 20 Concurrency, 2008, University of Delaware, available at https://www.eecis.udel.edu/~mccoy/courses/cisc280-08f/Lectures/Slides-20-concurrency.pdf (Year: 2008).*
(Continued)

*Primary Examiner* — Allen C Chein
(74) *Attorney, Agent, or Firm* — Lee & Hayes, P.C.

(57) ABSTRACT

A method and an apparatus for account processing are disclosed. The method includes splitting a master account into a plurality of sub-accounts, wherein a sum of balances of the plurality of sub-accounts is equal to a balance of the master account; and sending sub-account information of the master account to an application system upon receiving an accounting operation request for the master account from the application system, the sub-account information being used by the application system to perform an accounting operation on a sub-account of the master account. Since the embodiments of the present disclosure split a master account into a plurality of sub-accounts, an application system may perform an accounting operation on multiple sub-accounts of the master account concurrently to improve the efficiency of performing the accounting operations on the master account.

18 Claims, 9 Drawing Sheets

(56) References Cited

U.S. PATENT DOCUMENTS

2012/0303791 A1* 11/2012 Calder ............... H04L 67/1002
709/224
2013/0080299 A1* 3/2013 Dhakephalkar ........ G06Q 40/02
705/30

FOREIGN PATENT DOCUMENTS

| CN | 103166910 A | 6/2013 | |
|---|---|---|---|
| EP | 1081628 A1 * | 7/2001 | ............. G06F 19/00 |
| WO | WO0116768 | 3/2001 | |

OTHER PUBLICATIONS

"Introduction to Parallel Computing", Blaise Barney, snapshot taken May 2010, https://web.archive.org/web/20100527181410/ https://computing.llnl.gov/tutorials/parallel_comp/#Models Data, (Year: 2010).*
PCT Search Report and Written Opinion dated Oct. 29, 2015 for PCT Application No. PCT/US15/43473, 8 pages.
Translation of CN Office Action from Corresponding CN Application No. 201410380154.8 dated Jan. 30, 2019, a counterpart foreign application for U.S. Appl. No. 14/816,948 , 9 pages.
Translation of CN Office Action from Corresponding CN Application No. 201410380154.8 dated Aug. 21, 2019, a counterpart foreign application for U.S. Appl. No. 14/816,948 , 10 pages.
Translation of CNSearch Report from Corresponding CN Application No. 201410380154.8 dated Jan. 10, 2019, a counterpart foreign application for U.S. Appl. No. 14/816,948 , 2 pages.

* cited by examiner

ACCOUNT PROCESSING METHOD AND APPARATUS

CROSS REFERENCE TO RELATED PATENT APPLICATION

This application claims foreign priority to Chinese Patent Application No. 201410380154.8 filed on Aug. 4, 2014, entitled "Account Processing Method and Apparatus", which is hereby incorporated by reference in its entirety.

TECHNICAL FIELD

The present disclosure relates to the technological field of data processing, and in particular, to account processing methods and apparatuses.

BACKGROUND

In a payment system, bookkeeping operations, such as balance changes for the same account, comply with a principle of serial processing. Specifically, no matter how many concurrent bookkeeping operation requests there are, only one bookkeeping operation can be performed at one time for the same account. In a process of a bookkeeping operation, an exclusive lock is needed to lock the account, and each account can only use one exclusive lock. Such a serial processing method can avoid economic losses due to an erroneous result caused by simultaneously performing multiple bookkeeping operations on the account.

Although the aforementioned serial processing method can avoid the risk of economic losses caused by concurrent operations, the efficiency of the bookkeeping operations cannot be improved. Under this method, when an application system needs to perform multiple bookkeeping operations on a certain account, only one of application threads that handle each bookkeeping operation can acquire an exclusive lock of the account, and application threads that handle other bookkeeping operations can only perform respective bookkeeping operations after the exclusive lock is released. In this process, an application thread that fails to acquire the exclusive lock needs to suspend an application resource for performing a respective bookkeeping operation, and waits in a queue to acquire the exclusive lock. Since the resource of the application thread cannot be released, a collapse of the application system is very likely to occur when a relatively large number of concurrent bookkeeping operation requests for the account exist.

In short, the existing serial processing methods have a low efficiency of performing bookkeeping operations on an account. An application system performing the bookkeeping operations may be prone to crashes when a large number of concurrent bookkeeping operation requests exist, thereby causing a failure in transaction processing.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and an apparatus of account processing for solving the low efficiency problem of performing accounting operations on an account in existing serial processing method.

The embodiments of the present disclosure provide an account processing method, which may include splitting a master account into a plurality of sub-accounts, a sum of balances of the plurality of sub-accounts being equal to a balance of the master account; and sending sub-account information of the master account to an application system in response to receiving an accounting operation request for the master account sent by the application system, the sub-account information being used by the application system to perform accounting operation(s) on sub-account(s) of the master account.

Optionally, splitting the master account into the plurality of sub-accounts may include splitting the master account into the plurality of sub-accounts in response to determining that concurrent accounting operations on the master account are currently in a peak period.

Optionally, the peak period of the concurrent accounting operations on the master account may be determined by extracting accounting operation information for the master account from a system process log, and determining the peak period of the concurrent accounting operations on the master account based on accounting time information in the extracted accounting operation information.

Optionally, determining the peak period of the concurrent accounting operations on the master account based on the accounting time information in the extracted accounting operation information may include comparing a number of times of accounting for the master account in each preset period of time with a preset value, and determining that a particular preset period of time is the peak period of the concurrent accounting operations on the master account when a number of times of accounting for the master account in the particular preset period of time is equal to or greater than the preset value.

Optionally, after splitting the master account into the plurality of sub-accounts, the method may further include merging the balances of the plurality of sub-accounts of the master account into the master account in response to determining that concurrent accounting operations on the master account are not currently in a peak period.

Optionally, after merging the balances of the plurality of sub-accounts of the master account into the master account, the method may further include deleting the plurality of sub-accounts of the master account.

Optionally, splitting the master account into the plurality of sub-accounts may include splitting the master account into a plurality of sub-accounts each having a same balance in accordance with a preset number of sub-accounts; or splitting the master account into the plurality of sub-accounts in accordance with a plurality of preset sub-account balances and a respective number of sub-accounts of each preset sub-account balance.

Optionally, in response to receiving the accounting operation request for the master account sent by the application system, sending the sub-account information of the master account to the application system may include:

if the master account is split into a plurality of sub-accounts each having a same balance, sending sub-account information of at least one sub-account of the master account to the application system in response to receiving the accounting operation request for the master account sent by the application system;

if the master account is split into a plurality of sub-accounts in accordance with a plurality of preset sub-account balances and a respective number of sub-accounts of each preset sub-account balance, selecting a sub-account balance in line with an accounting amount of the accounting operation request from the plurality of preset sub-account balances and sending sub-account information of at least one sub-account having the selected sub-account balance to the application system in response to receiving the accounting operation request for the master account sent by the application system.

Optionally, after splitting the master account into the plurality of sub-accounts, the method may further include determining the sum of the balances of the plurality of sub-accounts of the master account and returning the determined sum of the balances of the plurality of sub-accounts if a balance query request for the master account is received.

The embodiments of the present disclosure provide an account processing apparatus, which may include a splitting module to split a master account into a plurality of sub-accounts, a sum of balances of the plurality of sub-accounts being equal to a balance of the master account; and a sending module to send sub-account information of the master account to an application system in response to receiving an accounting operation request for the master account sent by the application system, the sub-account information being used by the application system to perform accounting operation(s) on sub-account(s) of the master account.

By using the aforementioned account processing method and apparatus provided by the embodiments of the present disclosure, the master account is split into a plurality of sub-accounts, and an application system may perform accounting operations on different sub-accounts concurrently, thus improving the efficiency of the accounting operations on the master account and preventing an occurrence of a failure in transaction processing due to a crash caused by excessive concurrent accounting operation requests for the master account in the application system that performs the accounting operations.

DESCRIPTION OF THE DRAWINGS

In order to describe technical solutions in the embodiments of the present disclosure more clearly, accompanying drawings needed for describing the embodiments are briefly described herein. Apparently, the accompanying drawings described herein merely represent some embodiments of the present disclosure, and one of ordinary skill in the art may further derive other drawings from these accompanying drawings without making any creative effort.

DETAILED DESCRIPTION

Embodiments of the present disclosure relate to splitting a master account into a plurality of sub-accounts, and to sending sub-account information of the master account to an application system in response to receiving an accounting operation request for the master account from the application system to enable the application system to perform accounting operation(s) on sub-account(s) of the master account. Since the embodiments of the present disclosure split a master account into a plurality of sub-accounts, an application system may perform accounting operations concurrently on multiple sub-accounts of the master account, thereby enhancing the efficiency of the accounting operations on the master account and effectively avoiding an occurrence of a failure in transaction processing due to a crash caused by excessive concurrent accounting operation requests for the master account in the application system that performs the accounting operations.

Figure 1:
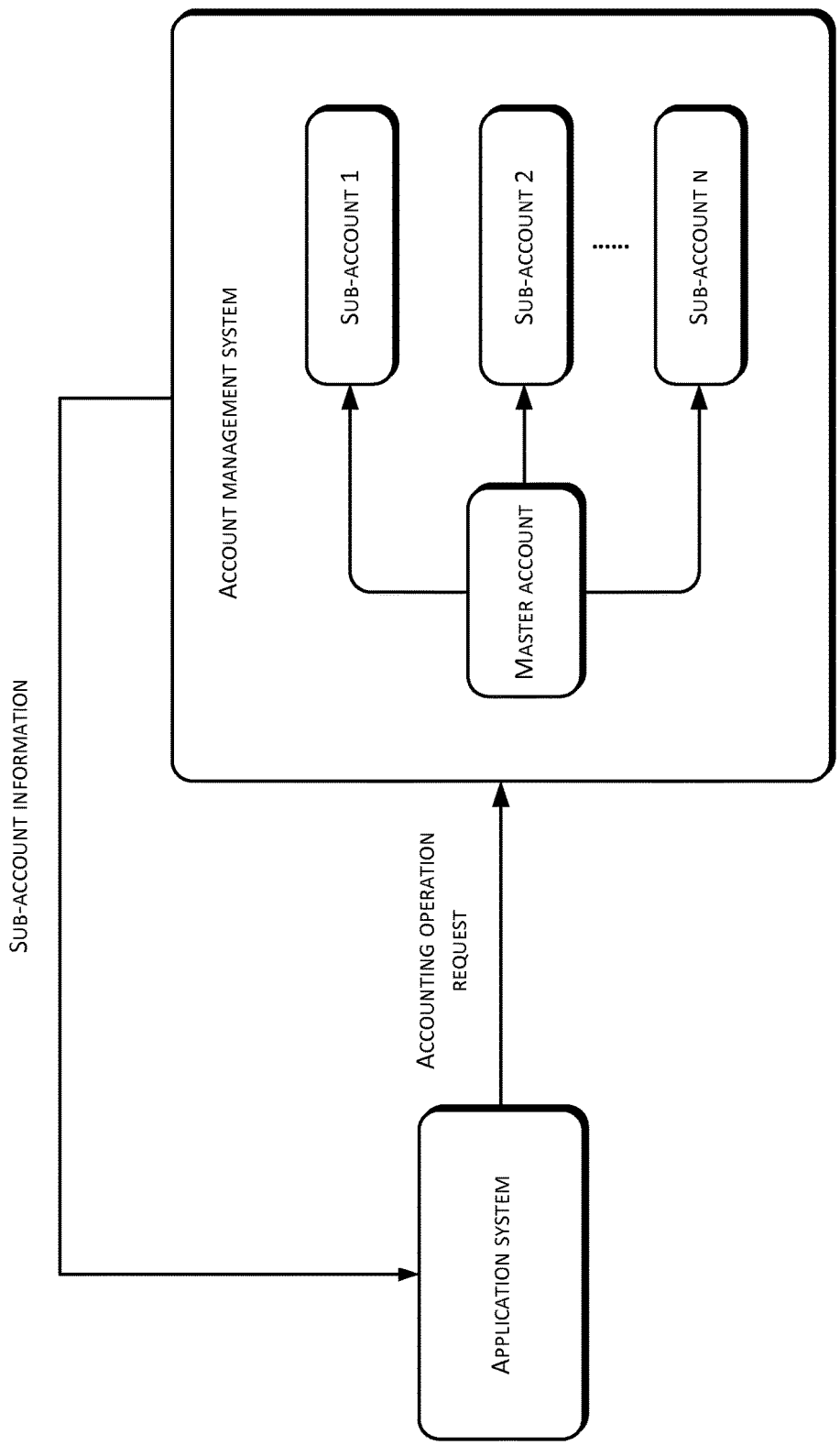
FIG. 1 is a schematic structural diagram illustrating a system that performs account processing according to an embodiment of the present disclosure.

An executing entity of the embodiments of the present disclosure may be called an account management system. FIG. 1 shows a schematic structural diagram of a system that performs account processing according to an embodiment of the present disclosure. The embodiment of the present disclosure involves an interaction between an application system and an account management system. The application system sends an accounting operation request for a master account to the account management system. The account management system sends sub-account information of the master account to the application system, and the application system performs accounting operation(s) on sub-account(s) of the master account.

The embodiments of the present disclosure are described in detail with reference to the accompanying drawings of the present disclosure.

Figure 2:
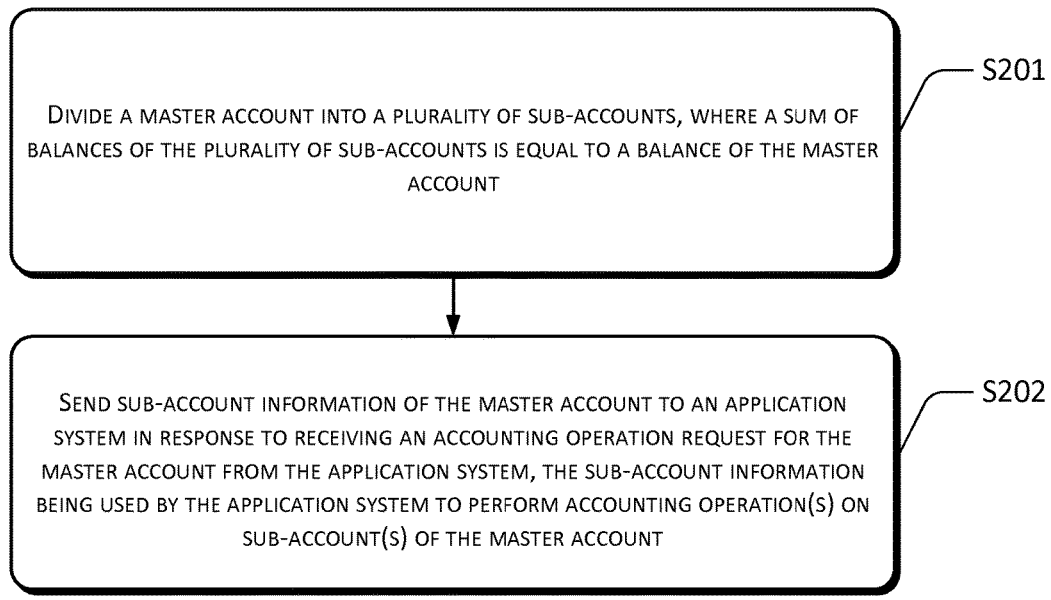
FIG. 2 is a flowchart of an account processing method according to a first embodiment of the present disclosure.

FIG. 2 shows a flowchart of an account processing method according to a first embodiment of the present disclosure, which includes:

S201 splits a master account into a plurality of sub-accounts, where a sum of balances of the plurality of sub-accounts is equal to a balance of the master account.

At this method block, a master account is split into at least two sub-accounts in accordance with a principle that a sum of balances of the sub-accounts is equal to a balance of the master account.

S202 sends sub-account information of the master account to an application system in response to receiving an accounting operation request for the master account from the application system, the sub-account information being used by the application system to perform accounting operation(s) on sub-account(s) of the master account.

At this method block, after the master account is split into the plurality of sub-accounts, sub-account information of at least one sub-account of the master account is sent to an application system if an accounting operation request is received from the application system. The application system selects a sub-account from the at least one sub-account to perform an accounting operation. The sub-account information may include information such as sub-account identifier(s) and a master account number, etc.

Optionally, after the master account is split into the plurality of sub-accounts at S201, the method may further include determining the sum of the balances of the plurality of sub-accounts of the master account and returning the determined sum of the balances of the plurality of sub-accounts if a balance query request for the master account is received.

In an implementation, prior to destroying the plurality of sub-accounts and merging the balances of the plurality of sub-accounts into the master account, the balances of the plurality of sub-accounts of the master account are collected and fed back to a transaction system if the account management system receives a balance query request for the master account from the transaction system.

At S201 described above, a master account may be split into a plurality of sub-accounts when the master account is generated. Alternatively, a master account is split into a plurality of sub-accounts in response to receiving an accounting operation request for the master account. In an implementation, a master account may be split into a plurality of sub-accounts when concurrent accounting operations on the master account are currently in a peak period. After the peak period of concurrent accounting operations on the master account is past, a balance of each sub-account may then be merged back into the master account to restore to a form of a single account to facilitate performing operations such as a balance query, etc. This implementation is described in further detail using a specific embodiment.

Figure 3:
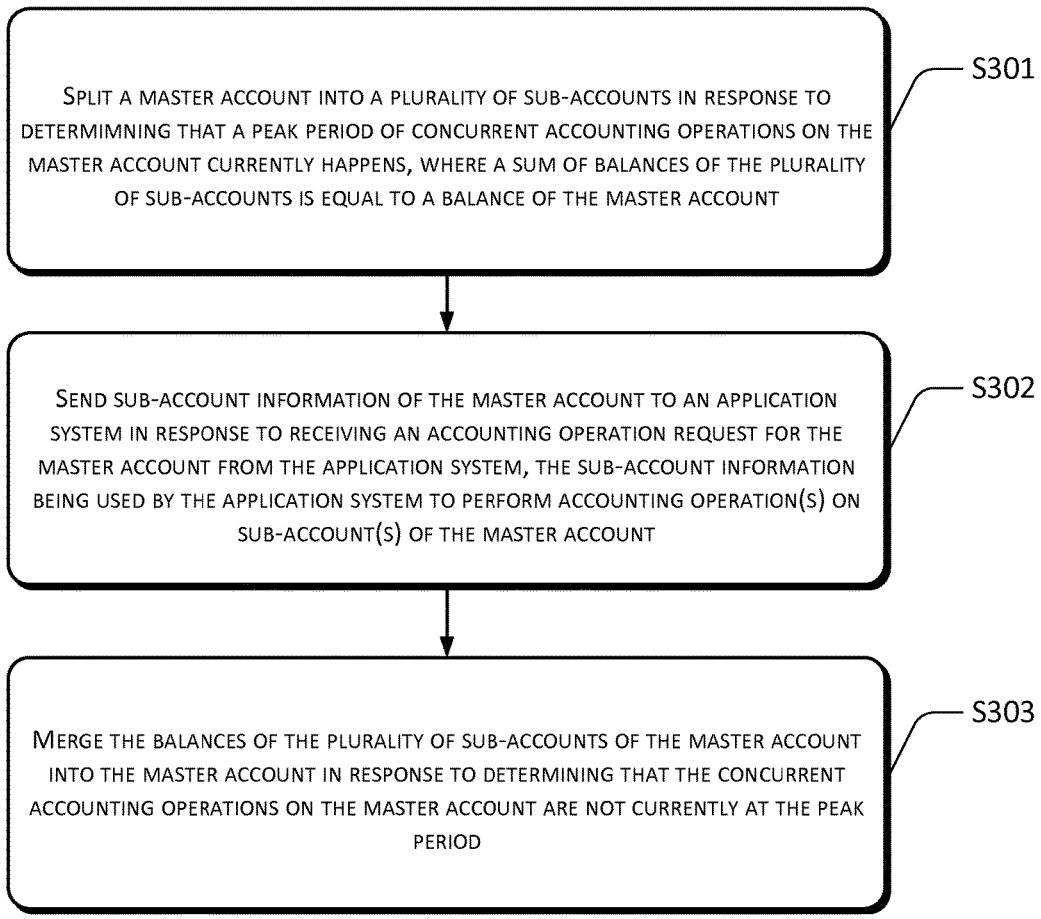
FIG. 3 is a flowchart of an account processing method according to a second embodiment of the present disclosure.

FIG. 3 shows a flowchart of an account processing method according to a second embodiment of the present disclosure, which includes:

S301 splits a master account into a plurality of sub-accounts in response to determining that a peak period of concurrent accounting operations on the master account currently happens, where a sum of balances of the plurality of sub-accounts is equal to a balance of the master account.

At this method block, a number of different approaches may be used by an account management system to determine a peak period of concurrent accounting operations on a master account. For example, a preset method may be used: a system operation and maintenance personnel sets up a master account, i.e., a hotspot account, that is to be split into a plurality of sub-accounts in advance, and sets a peak period of concurrent accounting operations for each hotspot account. Based on a preset peak period of concurrent accounting operations for a hotspot account and a current time, the account management system splits the hotspot account into a plurality of sub-accounts in response to determining that the current time is the peak period of concurrent accounting operations of the hotspot account. In order to save labor cost, the account management system may determine a peak period of concurrent accounting operations of a master account automatically. For example, the account management system may determine that concurrent accounting operations are currently at a peak period when a number of accounting operation requests that are received exceeds a preset threshold in the last preset time length (e.g., the last five minutes). However, this processing method may produce a delay in terms of the preset time length. In order to determine a peak period of concurrent accounting operations of a master account more accurately and to facilitate splitting of the master account timely, the embodiments of the present disclosure provide an implementation as follows:

extracting accounting operation information of the master account from a system process log, and determining a peak period of concurrent accounting operations on the master account based on accounting time information in the extracted accounting operation information.

In this approach, the account management system extracts accounting operation information for each master account from a system process log, and determines a peak period of concurrent accounting operations on a master account based on accounting time information in the accounting operation information corresponding to the master account for each master account. Specifically, a number of times of accounting for the master account in each preset period of time may be compared with a preset value. When the number of times of accounting for the master account in any preset period of time is greater than or equal to the preset value, that preset period of time is determined to be a peak period of concurrent accounting operations on the master account. For example, a day is divided into a plurality of preset periods of time in units of hours. A number of times of accounting in each preset period of time is determined, and a preset period of time having the number of times of accounting greater than or equal to the preset value is determined as a peak period of concurrent accounting operations.

It should be noted that the foregoing process of splitting a master account at S301 needs to be completed in a single database transaction. In other words, the splitting process needs to use an exclusive lock to acquire an exclusive control over the master account.

S302 sends sub-account information of the master account to an application system in response to receiving an accounting operation request for the master account from the application system, the sub-account information being used by the application system to perform accounting operation(s) on sub-account(s) of the master account.

At this method block, upon splitting the master account into the plurality of sub-accounts, the account management system sends sub-account information of at least one sub-account of the master account to an application system if receiving an accounting operation request from the application system. The application system selects a sub-account from the at least one sub-account to perform an accounting operation. The sub-account information may include information such as sub-account identifier(s) and a master account number.

S303 merges the balances of the plurality of sub-accounts of the master account into the master account in response to determining that the concurrent accounting operations on the master account are not currently at the peak period.

At this method block, after the peak period of concurrent accounting operations on the master account is past, the balances of the plurality of sub-accounts of the master account may be merged into the master account in order to facilitate the performance of operations on the entire master account, such as a balance query on the master account, etc. Thereafter, information of the master account is sent to the application system directly upon receiving the accounting operation request from the application system.

Optionally, after the balances of the plurality of sub-accounts of the master account are merged into the master account, the method may further include deleting the plurality of sub-accounts of the master account.

At S303, after the balances of the plurality of sub-accounts of the master account are merged into the master account, the plurality of sub-accounts may be retained, so that re-creation of the plurality of sub-accounts is not needed and the balance of the master account may be distributed to each sub-account directly when the next peak period of concurrent accounting operations on the master account happens. In the embodiments of the present disclosure, the plurality of sub-accounts may alternatively be deleted in order to save the storage space, and multiple sub-accounts may be created again when the next peak period of concurrent accounting operations on the master account happens.

In the first and second embodiments of the present disclosure, a master account needs to be split into a plurality of sub-accounts, and a rule of splitting includes a sum of balances of the plurality of sub-accounts being equal to a balance of the master account. An exemplary splitting mode may be a splitting mode of evenly dividing a balance or a splitting mode of predefining respective balances, which are described hereinafter using the following two embodiments. An overlapping portion between the following embodiments and the first and second embodiments will not be described in detail.

Figure 4:
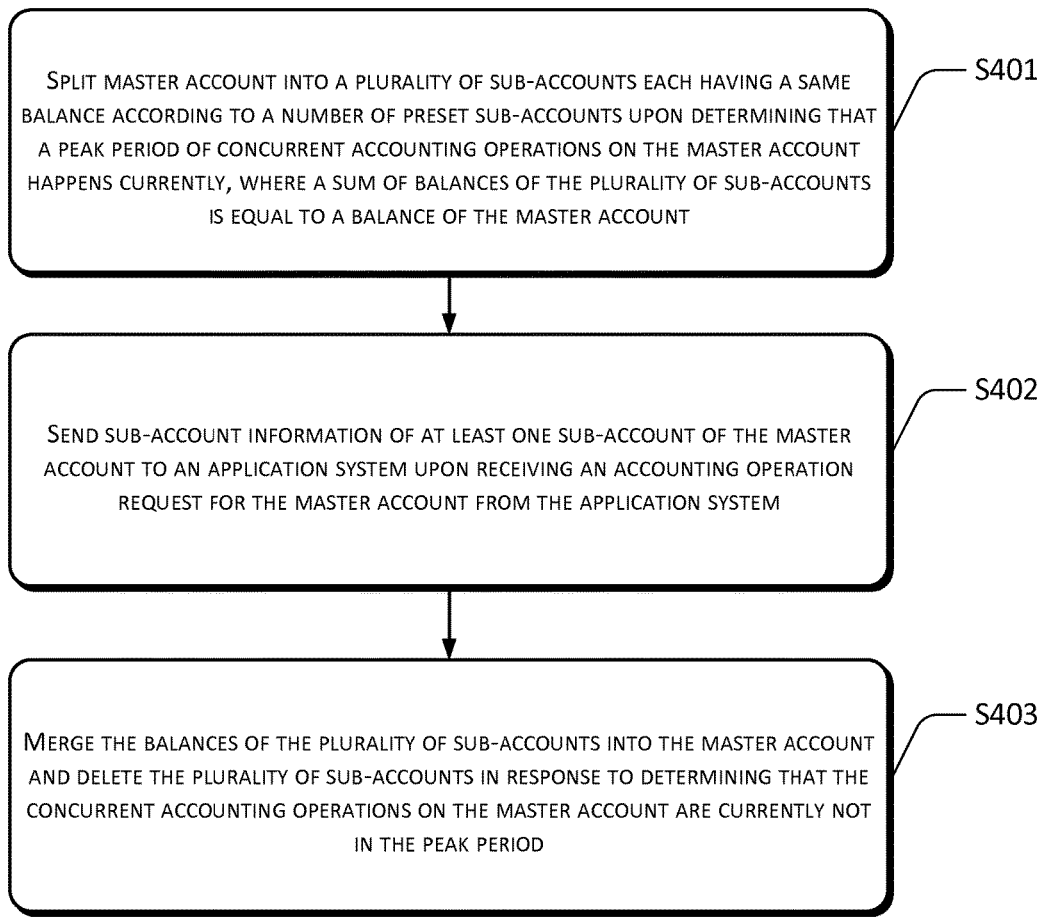
FIG. 4 is a flowchart of an account processing method according to a third embodiment of the present disclosure.

FIG. 4 shows a flowchart of an account processing method according to a third embodiment of the present disclosure. In this embodiment, a splitting mode that evenly divides a balance is adopted, which is easy and convenient to implement. An implementation thereof includes:

S401 splits master account into a plurality of sub-accounts each having a same balance according to a number of preset sub-accounts upon determining that a peak period of concurrent accounting operations on the master account happens currently, where a sum of balances of the plurality of sub-accounts is equal to a balance of the master account.

At this method block, the balance of the master account is divided into n equal portions, with each portion being a balance of each sub-account.

S402 sends sub-account information of at least one sub-account of the master account to an application system upon receiving an accounting operation request for the master account from the application system.

At this method block, the account management system may send sub-account information of all the sub-accounts of the master account to the application system. The application system may randomly select any sub-account from the at least one sub-account to perform an accounting operation. Alternatively, one or more sub-accounts may be randomly selected from the plurality of sub-accounts of the master account, and sub-account information of the randomly selected sub-account(s) is sent to the application system. When sub-account information of multiple sub-accounts are sent at random, the application system may randomly select any sub-account from the multiple sub-accounts to perform an accounting operation. Alternatively, a sub-account may be selected from the plurality of sub-accounts of the master account based on a load balancing rule of each sub-account and a respective number of accounting operation requests that are currently needed to be handled by each sub-account of the master account, and sub-account information of the selected sub-account is sent to the application system.

S403 merges the balances of the plurality of sub-accounts into the master account and deletes the plurality of sub-accounts in response to determining that the concurrent accounting operations on the master account are currently not in the peak period.

Figure 5:
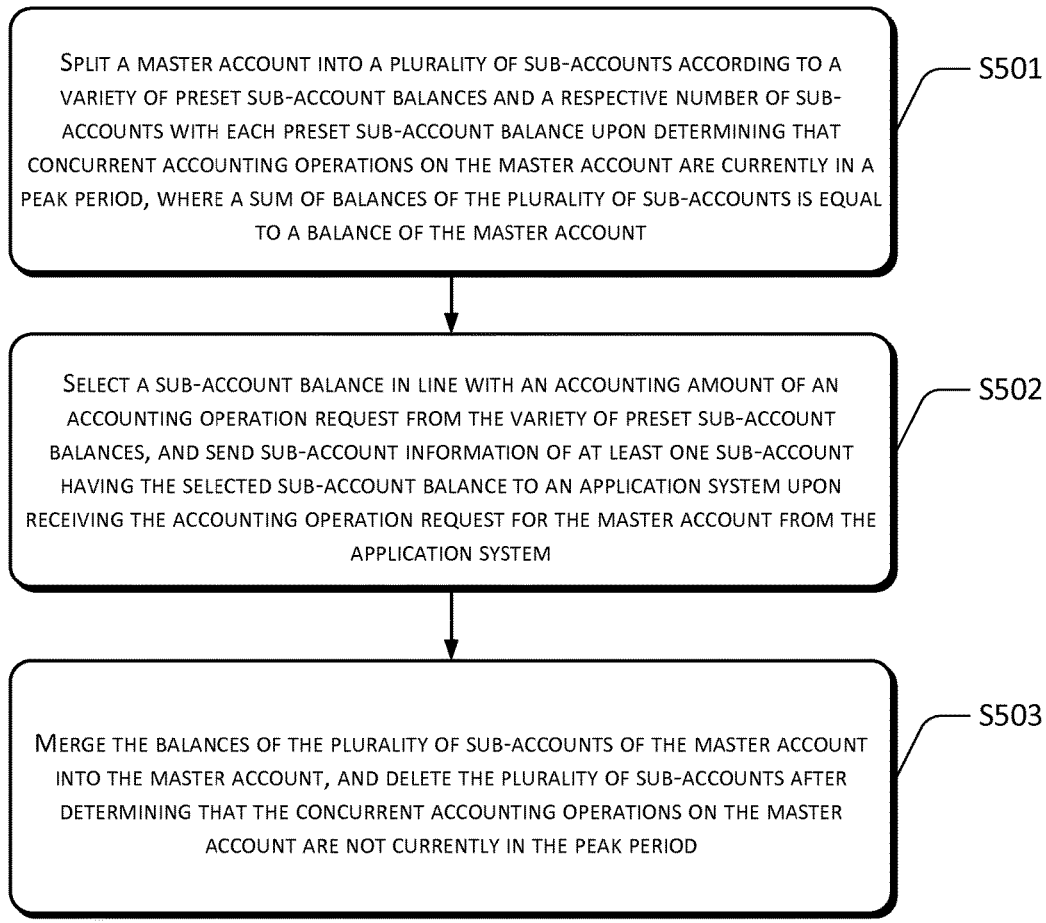
FIG. 5 is a flowchart of an account processing method according to a fourth embodiment of the present disclosure.

FIG. 5 shows a flowchart of an account processing method according to a fourth embodiment of the present disclosure. In this embodiment, a splitting mode that pre-defines respective balances is adopted. An implementation thereof may include:

S501 splits a master account into a plurality of sub-accounts according to a variety of preset sub-account balances and a respective number of sub-accounts with each preset sub-account balance upon determining that concurrent accounting operations on the master account are currently in a peak period, where a sum of balances of the plurality of sub-accounts is equal to a balance of the master account.

At this method block, according to a transaction property of a transaction using the master account, the master account is split into sub-accounts having a variety of preset balances, and each preset balance may be set up with multiple sub-accounts. For example, a master account having a balance of one hundred thousand dollars is split into multiple accounts of one hundred dollars, multiple accounts of one thousand dollars, and multiple accounts of ten thousand dollars, to enable individually handling of accounting operation(s) for an accounting amount less than or equal to ten dollars, accounting operation(s) for an accounting amount greater than ten dollars and less than or equal to one hundred dollars, and accounting operation(s) for an accounting amount greater than one hundred dollars.

S502 selects a sub-account balance in line with an accounting amount of an accounting operation request from the variety of preset sub-account balances, and sends sub-account information of at least one sub-account having the selected sub-account balance to an application system upon receiving the accounting operation request for the master account from the application system.

At this method block, the account management system selects a sub-account balance that satisfies an accounting amount of an accounting operation request from the variety of preset sub-account balances according to accounting amount information in the accounting operation request that is sent by an application system. For example, if the accounting amount of the accounting operation request is ten dollars, sub-account information of sub-accounts having a preset balance of one hundred dollars may be sent to the application system. The application system may randomly select a sub-account therefrom for performing an accounting operation.

S503 merges the balances of the plurality of sub-accounts of the master account into the master account, and deletes the plurality of sub-accounts after determining that the concurrent accounting operations on the master account are not currently in the peak period.

A lottery expenditure account and a lottery income account are used hereinafter as two examples of a master account for describing the embodiments of the present disclosure in further detail.

Figure 6:
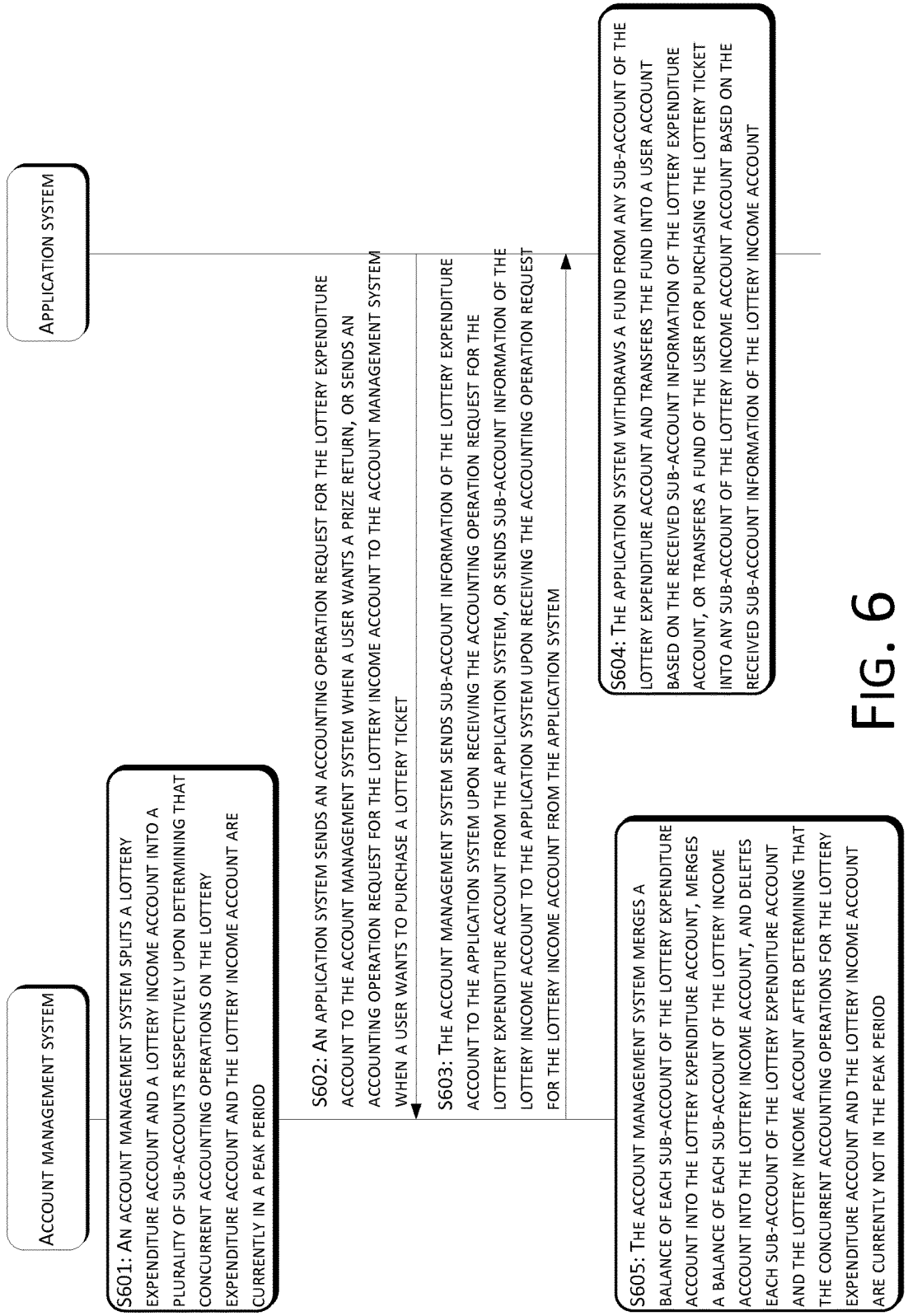
FIG. 6 is a flowchart of an account processing method according to a fifth embodiment of the present disclosure.

FIG. 6 shows a flowchart of an account processing method according to a fifth embodiment of the present disclosure, which includes:

At S601, an account management system splits a lottery expenditure account and a lottery income account into a plurality of sub-accounts respectively upon determining that concurrent accounting operations on the lottery expenditure account and the lottery income account are currently in a peak period.

Figure 7A:
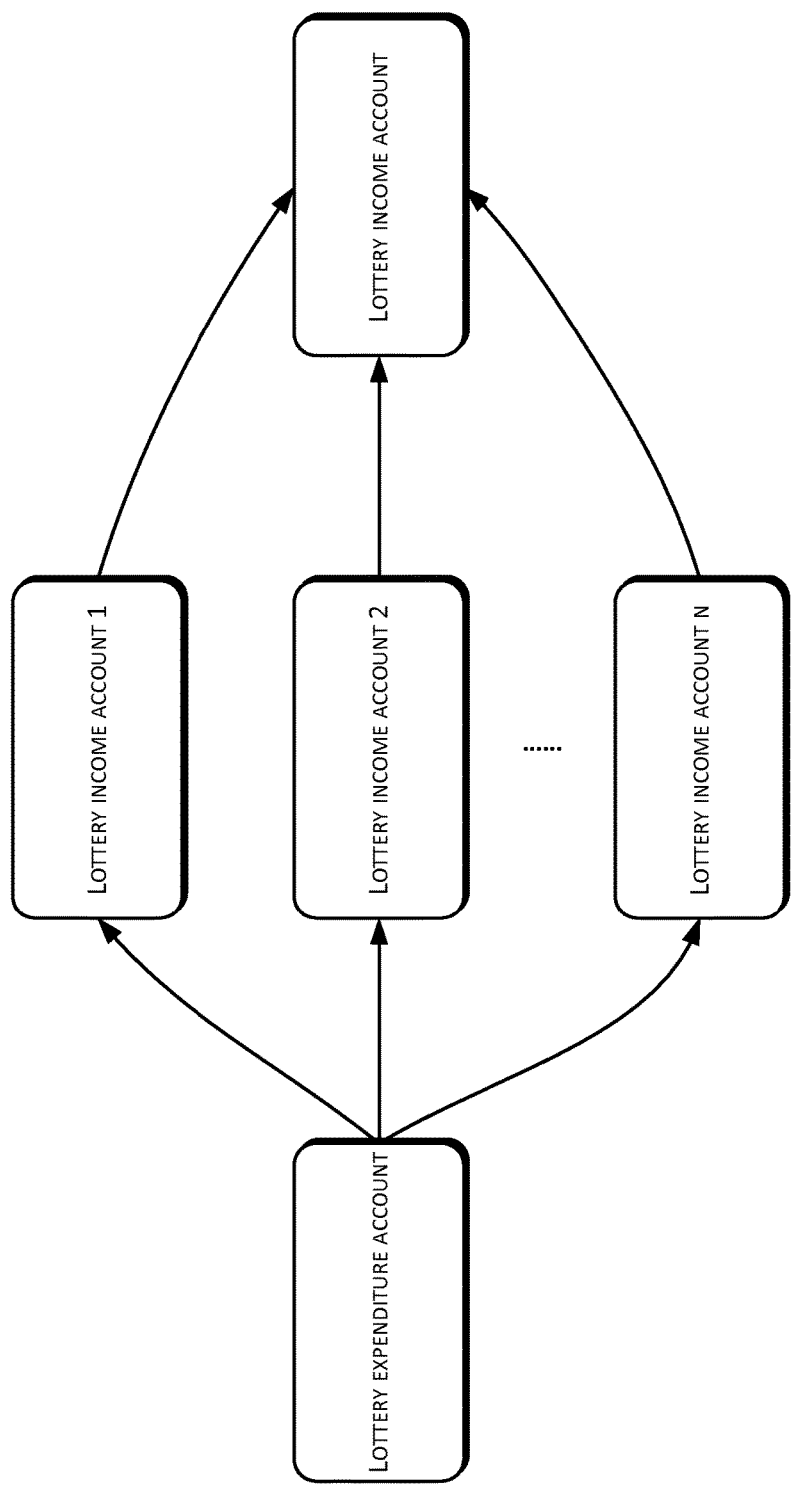
FIG. 7A is a schematic diagram illustrating an accounting operation performed before an account splitting.
Figure 7B:
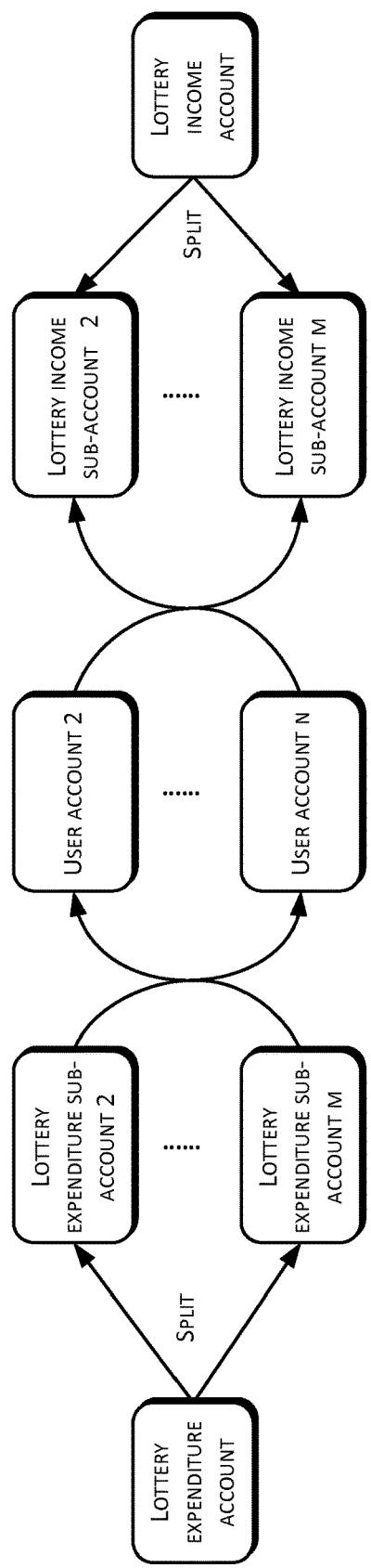
FIG. 7B is a schematic diagram illustrating an accounting operation performed after an account splitting.

FIG. 7A shows a schematic diagram of an accounting operation performed before account splitting, and FIG. 7B shows a schematic diagram of an accounting operation performed after the account splitting. The lottery income account and the lottery expenditure account are two hotspot accounts for services of lottery purchase and lottery prize return through the Internet. Generally, during the two time periods that are before and after a drawing, a large number of users buy lottery tickets and a great number of return prizes are returned to user accounts respectively. As shown in FIG. 7A, before the account splitting, users need to transfer funds into the lottery income account when purchasing lottery tickets, and funds need to be withdrawn from the lottery expenditure account and transferred into user accounts during the prize return. As shown in FIG. 7B, after the account splitting, a user may transfer a fund into any sub-account of the lottery income account when purchasing a lottery ticket, and a fund may be transferred from any sub-account of the lottery expenditure account into a user account during the prize return. As can be seen, this parallel accounting operation mode may increase the efficiency of accounting operations greatly, guarantee a real-time processing of the accounting operations and improve the user payment experience.

At S602, an application system sends an accounting operation request for the lottery expenditure account to the account management system when a user wants a prize return, or sends an accounting operation request for the lottery income account to the account management system when a user wants to purchase a lottery ticket.

At S603, the account management system sends sub-account information of the lottery expenditure account to the application system upon receiving the accounting operation request for the lottery expenditure account from the application system, or sends sub-account information of the lottery income account to the application system upon receiving the accounting operation request for the lottery income account from the application system.

At S604, the application system withdraws a fund from any sub-account of the lottery expenditure account and transfers the fund into a user account based on the received sub-account information of the lottery expenditure account, or transfers a fund of the user for purchasing the lottery ticket into any sub-account of the lottery income account account based on the received sub-account information of the lottery income account.

At S605, the account management system merges a balance of each sub-account of the lottery expenditure account into the lottery expenditure account, merges a balance of each sub-account of the lottery income account into the lottery income account, and deletes each sub-account of the lottery expenditure account and the lottery income account after determining that the concurrent accounting operations for the lottery expenditure account and the lottery income account are currently not in the peak period.

Based on the same inventive concept, the embodiments of the present disclosure further provide an account processing apparatus corresponding to the account processing methods. Since the principle of the apparatus for solving the problem is similar as that of the account processing methods of the embodiments of the present disclosure, reference may be made to the implementations of the methods for implementations of the apparatus, which are not repeatedly described herein.

Figure 8:
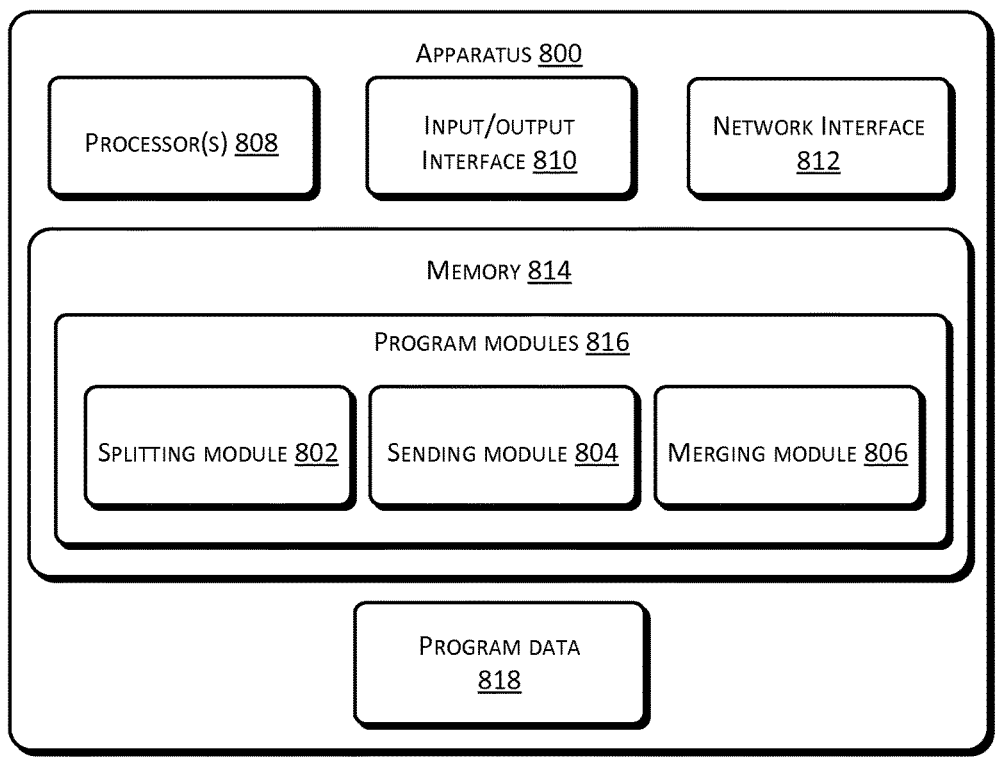
FIG. 8 is a schematic structural diagram illustrating an account processing apparatus according to a sixth embodiment of the present disclosure.

FIG. 8 shows a schematic structural diagram of an account processing apparatus 800 according to a sixth embodiment of the present disclosure, which includes:

a splitting module 802 to split a master account into a plurality of sub-accounts, wherein a sum of balances of the plurality of sub-accounts is equal to a balance of the master account; and a sending module 804 to send sub-account information of the master account to an application system after receiving an accounting operation request for the master account from the application system, the sub-account information being used by the application system to perform an accounting operation on a sub-account of the master account.

Optionally, the splitting module 802 splits the master account into the plurality of sub-accounts upon determining that concurrent accounting operations on the master account are currently in a peak period.

Optionally, the splitting module 802 extracts accounting operation information for the master account from a system process log, and determines a peak period of concurrent accounting operations on the master account based on accounting time information in the extracted accounting operation information.

Optionally, the splitting module 802 compares a number of times of accounting for the master account in each preset period of time with a preset value, and determines that a particular preset period of time is the peak period of concurrent accounting operations on the master account in response to determining a respective number of times of accounting for the master account in the particular preset period of time is equal to or greater than the preset value.

Optionally, the apparatus 800 may further include a merging module 806 to merge the balances of the plurality of sub-accounts of the master account into the master account in response to determining that the concurrent accounting operations on the master account are currently not in the peak period, after the splitting module 802 splits the master account into the plurality of sub-accounts.

Optionally, the merging module 806 further deletes the plurality of sub-accounts of the master account after the balances of the plurality of sub-accounts of the master account are merged into the master account.

Optionally, the splitting module 802 splits the master account into a plurality of sub-accounts each having a same balance in accordance with a preset number of sub-accounts, or splits the master account into the plurality of sub-accounts in accordance with a plurality of different preset sub-account balances and a respective number of sub-accounts of each preset sub-account balance Optionally, the sending module 804 is configured to:

if the splitting module 802 splits the master account into a plurality of sub-accounts each having a same balance, send sub-account information of at least one sub-account of the master account to the application system in response to receiving the accounting operation request for the master account sent by the application system;

if the splitting module 802 splits the master account into a plurality of sub-accounts in accordance with a plurality of different preset sub-account balances and a respective number of sub-accounts of each preset sub-account balance, select a sub-account balance in line with an accounting amount of the accounting operation request from the plurality of preset sub-account balances and send sub-account information of at least one sub-account having the selected sub-account balance to the application system in response to receiving the accounting operation request for the master account sent by the application system.

Optionally, the sending module 804 may further determine the sum of the balances of the plurality of sub-accounts of the master account, and return the determined sum of the balances of the plurality of sub-accounts upon receiving a balance query request for the master account, after the splitting module 802 has split the master account into the plurality of sub-accounts.

In an embodiment, the apparatus 800 may include one or more computing devices. In an embodiment, the apparatus 800 may include one or more processors 808, an input/output interface 810, a network interface 812 and memory 814.

The memory 814 may include a form of computer readable media such as volatile memory, Random Access Memory (RAM), and/or non-volatile memory, e.g., Read- Only Memory (ROM) or flash RAM, etc. The memory 814 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 814 may include program modules 816 and program data 818. The program modules 816 may include one or more modules as described in the foregoing embodiments. For example, the program modules 816 may include one or more of the splitting module 802, the sending module 804 and the merging module 806. Details of these modules have been described in the foregoing embodiments, and are therefore not repeatedly described herein.

One skilled in the art should understand that the embodiments of the present disclosure can be provided as a method, a system or a product of a computer program. Therefore, the present disclosure can be implemented as an embodiment of hardware only, an embodiment of software only, or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The present disclosure is described in accordance with flowcharts and/or block diagrams of the exemplary methods, apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate a computer implemented process. Therefore, the instructions executed by the computer or the other programmable apparatus may be used to implement one or more processes of the flowcharts and/or one or more blocks of the block diagrams.

Although exemplary embodiments of the present disclosure have been described, one skilled in the art may make other changes and modifications to these embodiments once understanding the basic inventive concept. Therefore, the appended claims are intended to include the exemplary embodiments and all the changes and modifications which fall within the scope of the present disclosure.

Apparently, one skilled in the art may make various modifications and changes to the present disclosure without departing from the spirit of the present disclosure. In this way, if these modifications and changes to the present disclosure fall within the scope of the claims of the present disclosure and equivalents thereof, the present disclosure also intends to cover these modifications and changes.

The invention claimed is:

1. A method implemented by one or more computing devices, the method comprising:
   acquiring an exclusive control over a master account using an exclusive lock;
   determining whether concurrent accounting operations on the master account are in a peak period currently;
   upon determining that the concurrent accounting operations on the master account are in the peak period currently:
      splitting the master account into a plurality of sub-accounts in a single database transaction, a sum of balances of the plurality of sub-accounts being equal to a balance of the master account,
      sending sub-account information of more than one sub-accounts from the plurality of sub-accounts of the master account to an application system in response to receiving an accounting operation request for the master account from the application system, and
      improving efficiency of accounting operations by concurrently performing, by the application system, accounting operations on the more than one sub-accounts from the plurality of sub-accounts of the master account based on the sub-account information; and
   upon determining that the concurrent accounting operations on the master account are no longer in the peak period after splitting the master account into the plurality of sub-accounts of the master account:
      merging the balances of the plurality of sub-accounts of the master account into the master account, and
      retaining the plurality of sub-accounts and using the retained plurality of sub-accounts when a next peak period occurs.

2. The method of claim 1, wherein determining whether the concurrent accounting operations on the master account are in the peak period currently includes:
   extracting accounting operation information for the master account from a system process log; and
   determining whether the concurrent accounting operations on the master account are in the peak period currently based on accounting time information in the extracted accounting operation information.

3. The method of claim 2, wherein determining whether the concurrent accounting operations on the master account are in the peak period currently based on the accounting time information in the extracted accounting operation information includes:
comparing a number of times of accounting for the master account in each preset period of time with a preset value; and
determining that a particular preset period of time is the peak period of the concurrent accounting operations on the master account in response to determining that a respective number of times of accounting for the master account in the particular preset period of time is equal to or greater than the preset value.

4. The method of claim 1, wherein splitting the master account into the plurality of sub-accounts comprises:
splitting the master account into the plurality of sub-accounts with each sub-account having a same balance based on a preset number of the plurality of sub-accounts; or
splitting the master account into the plurality of sub-accounts based on a plurality of different preset sub-account balances and a respective number of sub-accounts of each preset sub-account balance.

5. The method of claim 1, wherein sending the sub-account information of the more than one sub-accounts from the plurality of sub-accounts of the master account to the application system comprises:
sending the sub-account information of the more than one sub-accounts from the plurality of sub-accounts of the master account to the application system in response to receiving the accounting operation request for the master account sent by the application system if the master account is split into the plurality of sub-accounts with each sub-account having a same balance; or
selecting a sub-account balance in line with an accounting amount of the accounting operation request from a plurality of different preset sub-account balances and sending sub-account information of the more than one sub-accounts, the more than one sub-accounts having the selected sub-account balance to the application system in response to receiving the accounting operation request for the master account sent by the application system if the master account is split into the plurality of sub-accounts based on the plurality of different preset sub-account balances and a respective number of sub-accounts of each preset sub-account balance.

6. The method of claim 1, further comprising determining the sum of the balances of the plurality of sub-accounts of the master account and returning the determined sum of the balances of the plurality of sub-accounts in response to receiving a balance query request for the master account.

7. An apparatus comprising:
one or more processors;
memory;
a splitting module stored in the memory and executable by the one or more processors to:
acquire an exclusive control over a master account using an exclusive lock, and
in response to determining that concurrent accounting operations on the master account are in a peak period currently, split the master account into a plurality of sub-accounts in a single database transaction, a sum of balances of the plurality of sub-accounts being equal to a balance of the master account;
a sending module stored in the memory and executable by the one or more processors to send sub-account information of more than one sub-accounts from the plurality of sub-accounts of the master account to an application system in response to receiving an accounting operation request for the master account from the application system, wherein the application system is configured to improve effeciency of accounting operations by concurrently perfroming accounting operations on more than one sub-accounts from the plurality of sub-accounts of the master account based on the sub-account information; and
a merging module executable by the one or more processors to:
merge the balances of the plurality of sub-accounts of the master account into the master account in response to determining that the concurrent accounting operations are no longer in the peak period after the splitting module has split the master account into the plurality of sub-accounts, and
retain the plurality of sub-accounts and use the retained plurality of sub-accounts when a next peak period occurs.

8. The apparatus of claim 7, wherein the splitting module further extracts accounting operation information for the master account from a system process log, and determines the peak period of the concurrent accounting operations on the master account based on accounting time information in the extracted accounting operation information.

9. The apparatus of claim 8, wherein the splitting module further compares a respective number of times of accounting for the master account in each preset period of time with a preset value, and determines that a particular preset period of time is the peak period of the concurrent accounting operations on the master account when a corresponding number of times of accounting for the master account in the particular preset period of time is equal to or greater than the preset value.

10. The apparatus of claim 7, wherein the splitting module is specifically configured to:
split the master account into a plurality of sub-accounts with a same balance in accordance with the quantity of the preset sub-accounts; or
split the master account into a plurality of sub-accounts in accordance with a variety of preset sub-account balances and the quantity of the sub-accounts with each preset sub-account balance.

11. The apparatus of claim 10, wherein the sending module is further configured to:
send the sub-account information of the more than one sub-accounts from the plurality of sub-accounts of the master account to the application system in response to receiving the accounting operation request for the master account sent by the application system if the splitting module splits the master account into a plurality of sub-accounts each having the same balance; or
select a sub-account balance in line with an accounting amount of the accounting operation request from a plurality of preset sub-account balances and send sub-account information of the more than one sub-accounts, the more than one sub-accounts having the selected sub-account balance to the application system in response to receiving the accounting operation request for the master account sent by the application system if the splitting module splits the master account into a plurality of sub-accounts in accordance with the plurality of different preset sub-account balances and a respective number of sub-accounts of each preset sub-account balance.

12. The apparatus of claim 7, wherein the sending module further determines the sum of the balances of the plurality of sub-accounts of the master account, and returns the determined sum of the balances of the plurality of sub-accounts upon receiving a balance query request for the master account, after the splitting module has split the master account into the plurality of sub-accounts.

13. One or more non-transitory computer-readable media storing executable instructions that, when executed by one or more processors, cause the one or more processors to perform acts comprising:
   acquiring an exclusive control over a master account using an exclusive lock;
   determining whether concurrent accounting operations on the master account are in a peak period currently;
   upon determining that the concurrent accounting operations on the master account are in the peak period currently:
      splitting the master account into a plurality of sub-accounts in a single database transaction, a sum of balances of the plurality of sub-accounts being equal to a balance of the master account,
      sending sub-account information of more than one sub-accounts from the plurality of sub-accounts of the master account to an application system in response to receiving an accounting operation request for the master account from the application system, and
      improving efficiency of accounting operations by concurrently performing, by the application sytem, accounting operations on the more than one sub-accounts from the plurality of sub-accounts of the master account based on the sub-account information, and
   upon determining that the concurrent accounting operations on the master account are no longer in the peak period after splitting the master account into the plurality of sub-accounts of the master account:
      merging the balances of the plurality of sub-accounts of the master account into the master account, and
      retaining the plurality of sub-accounts and using the retained plurality of sub-accounts when a next peak period occurs.

14. The one or more non-transitory computer-readable media of claim 13, wherein determining whether the concurrent accounting operations on the master account are in the peak period currently includes:
   extracting accounting operation information for the master account from a system process log; and
   determining whether the concurrent accounting operations on the master account are in the peak period currently based on accounting time information in the extracted accounting operation information.

15. The one or more non-transitory computer-readable media of claim 14, wherein determining whether the concurrent accounting operations on the master account are in the peak period currently based on the accounting time information in the extracted accounting operation information includes:
   comparing a number of times of accounting for the master account in each preset period of time with a preset value; and
   determining that a particular preset period of time is the peak period of the concurrent accounting operations on the master account in response to determining that a respective number of times of accounting for the master account in the particular preset period of time is equal to or greater than the preset value.

16. The one or more non-transitory computer-readable media of claim 13, wherein splitting the master account into the plurality of sub-accounts comprises:
   splitting the master account into the plurality of sub-accounts with each sub-account having a same balance based on a preset number of the plurality of sub-accounts; or
   splitting the master account into the plurality of sub-accounts based on a plurality of different preset sub-account balances and a respective number of sub-accounts of each preset sub-account balance.

17. The one or more non-transitory computer-readable media of claim 13, wherein sending the sub-account information of the more than one sub-accounts from the plurality of sub-accounts of the master account to the application system comprises:
   sending the sub-account information of the more than one sub-accounts from the plurality of sub-accounts of the master account to the application system in response to receiving the accounting operation request for the master account sent by the application system if the master account is split into the plurality of sub-accounts with each sub-account having a same balance; or
   selecting a sub-account balance in line with an accounting amount of the accounting operation request from a plurality of different preset sub-account balances and sending sub-account information of the more than one sub-accounts, the more than one sub-accounts having the selected sub-account balance to the application system in response to receiving the accounting operation request for the master account sent by the application system if the master account is split into the plurality of sub-accounts based on the plurality of different preset sub-account balances and a respective number of sub-accounts of each preset sub-account balance.

18. The one or more non-transitory computer-readable media of claim 13, wherein the acts further comprise:
   determining the sum of the balances of the plurality of sub-accounts of the master account and returning the determined sum of the balances of the plurality of sub-accounts in response to receiving a balance query request for the master account.

* * * * *